(12) United States Patent
Obrecht et al.

(10) Patent No.: US 7,832,011 B2
(45) Date of Patent: *Nov. 9, 2010

(54) METHOD AND APPARATUS FOR DETECTING MALICIOUS CODE IN AN INFORMATION HANDLING SYSTEM

(75) Inventors: Mark Eric Obrecht, Austin, TX (US); Michael Anthony Alagna, Austin, TX (US); Charles Andrew Payne, Austin, TX (US)

(73) Assignee: Symantec Corporation, Mountain View, CA (US)

( * ) Notice: Subject to any disclaimer, the term of this patent is extended or adjusted under 35 U.S.C. 154(b) by 521 days.

This patent is subject to a terminal disclaimer.

(21) Appl. No.: 10/647,644

(22) Filed: Aug. 25, 2003

(65) Prior Publication Data

US 2004/0064736 A1     Apr. 1, 2004

Related U.S. Application Data

(63) Continuation-in-part of application No. 10/231,557, filed on Aug. 30, 2002, now Pat. No. 7,748,039.

(51) Int. Cl.
*G06F 21/22* (2006.01)
*G06F 21/00* (2006.01)
*G06F 15/16* (2006.01)

(52) U.S. Cl. .............. 726/24; 726/23; 726/22; 713/150; 713/188; 713/189

(58) Field of Classification Search ............... None
See application file for complete search history.

(56) References Cited

U.S. PATENT DOCUMENTS

| 5,121,345 A | 6/1992 | Lentz |
| 5,440,723 A * | 8/1995 | Arnold et al. ............ 714/2 |
| 5,537,540 A | 7/1996 | Miller et al. |
| 5,802,277 A | 9/1998 | Cowlard |
| 5,919,257 A | 7/1999 | Trostle |
| 5,956,481 A | 9/1999 | Walsh et al. |

(Continued)

FOREIGN PATENT DOCUMENTS

WO     99/00720 A     1/1999

(Continued)

OTHER PUBLICATIONS

Shieh, et al, "A Pattern-Oriented Intrusion-Detection Model and its Applications," IEEE, 1991, pp. 327-342.

(Continued)

*Primary Examiner*—Syed A. Zia
(74) *Attorney, Agent, or Firm*—Meyertons, Hood, Kivlin, Kowert & Goetzel, P.C.; Dean M. Munyon

(57) ABSTRACT

Malicious code detection code is executed by an information handling system. The malicious code detection code includes detection routines. The detection routines are applied to executable code under investigation. The detection routines associate weights to respective code under investigation in response to detections of a valid program or malicious code as a function of the detection routines. It is determined whether code under investigation is a valid program or malicious code as a function of the weights associated by the detection routines.

65 Claims, 2 Drawing Sheets

U.S. PATENT DOCUMENTS

| | | | |
|---|---|---|---|
| 5,970,405 A * | 10/1999 | Kaplan et al. | 455/410 |
| 6,088,804 A * | 7/2000 | Hill et al. | 726/25 |
| 6,161,130 A | 12/2000 | Horvitz et al. | |
| 6,182,227 B1 | 1/2001 | Blair et al. | |
| 6,266,774 B1 * | 7/2001 | Sampath et al. | 726/24 |
| 6,272,641 B1 | 8/2001 | Ji | |
| 6,330,588 B1 | 12/2001 | Freeman | |
| 6,357,008 B1 | 3/2002 | Nachenberg | |
| 6,393,568 B1 | 5/2002 | Ranger et al. | |
| 6,523,120 B1 | 2/2003 | Strasnick | |
| 6,560,632 B1 * | 5/2003 | Chess et al. | 709/201 |
| 6,671,812 B1 * | 12/2003 | Balasubramaniam et al. | 726/22 |
| 6,772,346 B1 * | 8/2004 | Chess et al. | 716/13 |
| 6,775,780 B1 * | 8/2004 | Muttik | 726/24 |
| 6,842,861 B1 * | 1/2005 | Cox et al. | 713/188 |
| 6,944,772 B2 | 9/2005 | Dozortsev | |
| 6,963,978 B1 * | 11/2005 | Muttik et al. | 713/188 |
| 6,973,577 B1 * | 12/2005 | Kouznetsov | 726/25 |
| 7,089,591 B1 * | 8/2006 | Chi | 726/24 |
| 7,210,168 B2 * | 4/2007 | Hursey et al. | 726/24 |
| 7,287,279 B2 * | 10/2007 | Bertman et al. | 726/23 |
| 7,441,273 B2 * | 10/2008 | Edwards et al. | 726/24 |
| 7,457,823 B2 * | 11/2008 | Shraim et al. | 1/1 |
| 7,480,683 B2 * | 1/2009 | Thomas et al. | 1/1 |
| 7,493,403 B2 * | 2/2009 | Shull et al. | 709/229 |
| 7,509,679 B2 * | 3/2009 | Alagna et al. | 726/24 |
| 7,533,131 B2 * | 5/2009 | Thomas et al. | 1/1 |
| 7,739,337 B1 * | 6/2010 | Jensen | 709/206 |
| 7,748,039 B2 * | 6/2010 | Obrecht et al. | 726/25 |
| 2002/0066024 A1 | 5/2002 | Schmall et al. | |
| 2002/0116635 A1 | 8/2002 | Sheymov | |
| 2002/0150243 A1 | 10/2002 | Craft et al. | |
| 2002/0162015 A1 * | 10/2002 | Tang | 713/200 |
| 2002/0174137 A1 | 11/2002 | Wolff et al. | |
| 2003/0033536 A1 | 2/2003 | Pak et al. | |
| 2003/0159070 A1 | 8/2003 | Mayer et al. | |
| 2003/0174137 A1 | 9/2003 | Leung et al. | |
| 2003/0177397 A1 * | 9/2003 | Samman | 713/201 |
| 2004/0054917 A1 | 3/2004 | Obrecht et al. | |
| 2004/0098607 A1 | 5/2004 | Alagna et al. | |
| 2004/0123157 A1 | 6/2004 | Alagna et al. | |
| 2004/0187023 A1 | 9/2004 | Alagna et al. | |
| 2005/0081059 A1 | 4/2005 | Bandini et al. | |
| 2005/0137980 A1 * | 6/2005 | Bullock et al. | 705/44 |

FOREIGN PATENT DOCUMENTS

| | | |
|---|---|---|
| WO | 99/50734 A | 10/1999 |
| WO | WO 02/03178 | 1/2002 |
| WO | WO 02/095553 | 11/2002 |
| WO | WO 2004/021197 | 3/2004 |
| WO | WO 2004/055632 | 7/2004 |
| WO | WO 2004/072777 | 8/2004 |

OTHER PUBLICATIONS

Office Action of Feb. 7, 2006, in U.S. Appl. No. 10/231,557, 21 pages.
Amendment; Response to Office Action of. Feb. 7, 2006, in U.S. Appl. No. 10/231,557, pp. 1-23.
U.S. Appl. No. 10/231,557, filed Aug. 30, 2002.
Veldman, "Combating Viruses Heuristically", Virus Bulletin Conference, Virus Bulletin Ltd., Abington, GB, Sep. 1993.
International search report application No. 04707408.3 mailed Mar. 2, 2007 .
Veldman, Frans, "Combining Viruses Heuristically," Virus Bulletin Conference, Virus Bulletin Ltd., Abington, GB, Sep. 1993, pp. 67-75. XP000828110.
Nachenberg, Carey, "Behavior Blocking: The Next Step in Anti-Virus Protection," http://www.securityfocus.com/infocus/1557, retrieved Jul. 25, 2007, pp. 1-5, XP002444153.
"Automated Program Analysis for Computer Virus Detection," IBM Technical Disclosure Bulletin, IBM Corp., New York, US, vol. 34, No. 2, Jul. 1, 1991, pp. 415-416, XP000211158, ISSN: 0018-8689.
Supplemental European Search Report mailed Aug. 6, 2007, cited in European Application No. 03791906.5.
Amendment; Response to Office Action of Feb. 20, 2008, in U.S. Appl. No. 10/231,557, pp. 1-24.
Office Action of Jul. 1, 2008, in U.S. Appl. No. 10/231,557, 29 pages.
Amendment; Response to Office Action of Jul. 1, 2008, in U.S. Appl. No. 10/231,557, pp. 1-26.
Office Action of Sep. 9, 2009, in U.S. Appl. No. 10/231,557, 15 pages.
Communication Pursuant to Article 94(3) EPC in Application No. EP 04 707 408.3 issued Jun. 2, 2008, 6 pages.
PCT Search Report, PCT No. PCT/US01/17275, Jan. 10, 2002, 4 pages.

* cited by examiner

METHOD AND APPARATUS FOR DETECTING MALICIOUS CODE IN AN INFORMATION HANDLING SYSTEM

CROSS-REFERENCE TO RELATED APPLICATIONS

This application claims priority to and is a continuation-in-part of co-owned co-pending U.S. patent application Ser. No. 10/231,557, filed Aug. 30, 2002, by Obrecht et al., entitled METHOD AND APPARATUS FOR DETECTING MALICIOUS CODE IN THE FORM OF A TROJAN HORSE IN AN INFORMATION HANDLING SYSTEM, which is incorporated herein by reference in its entirety.

BACKGROUND

The present disclosure relates generally to information handling systems, and more particularly to a method and apparatus for detecting malicious code in an information handling system.

Malicious code is computer software code that is executed by an information handling system, typically a computer (but it can also be a Personal Digital Assistant, embedded system, or other information handling device), and can be used for malicious purposes, such as damaging, altering or using the system without permission or knowledge of the system's owner or user, even if the code also has legitimate purposes. There are many different types of malicious code, such as trojan horses, remote control software, keystroke loggers, spyware, worms, viruses, and monitoring software.

Accordingly, a need has arisen for a method and apparatus for detecting malicious code in an information handling system, in which various shortcomings of previous techniques are overcome.

SUMMARY

Malicious code detection code is executed by an information handling system. The malicious code detection code includes detection routines. The detection routines are applied to executable code under investigation. The detection routines associate weights to respective code under investigation in response to detections of a valid program or malicious code as a function of the detection routines. It is determined whether code under investigation is a valid program or malicious code as a function of the weights associated by the detection routines.

It is a technical advantage that various shortcomings of previous techniques are overcome.

DETAILED DESCRIPTION

Figure 1:
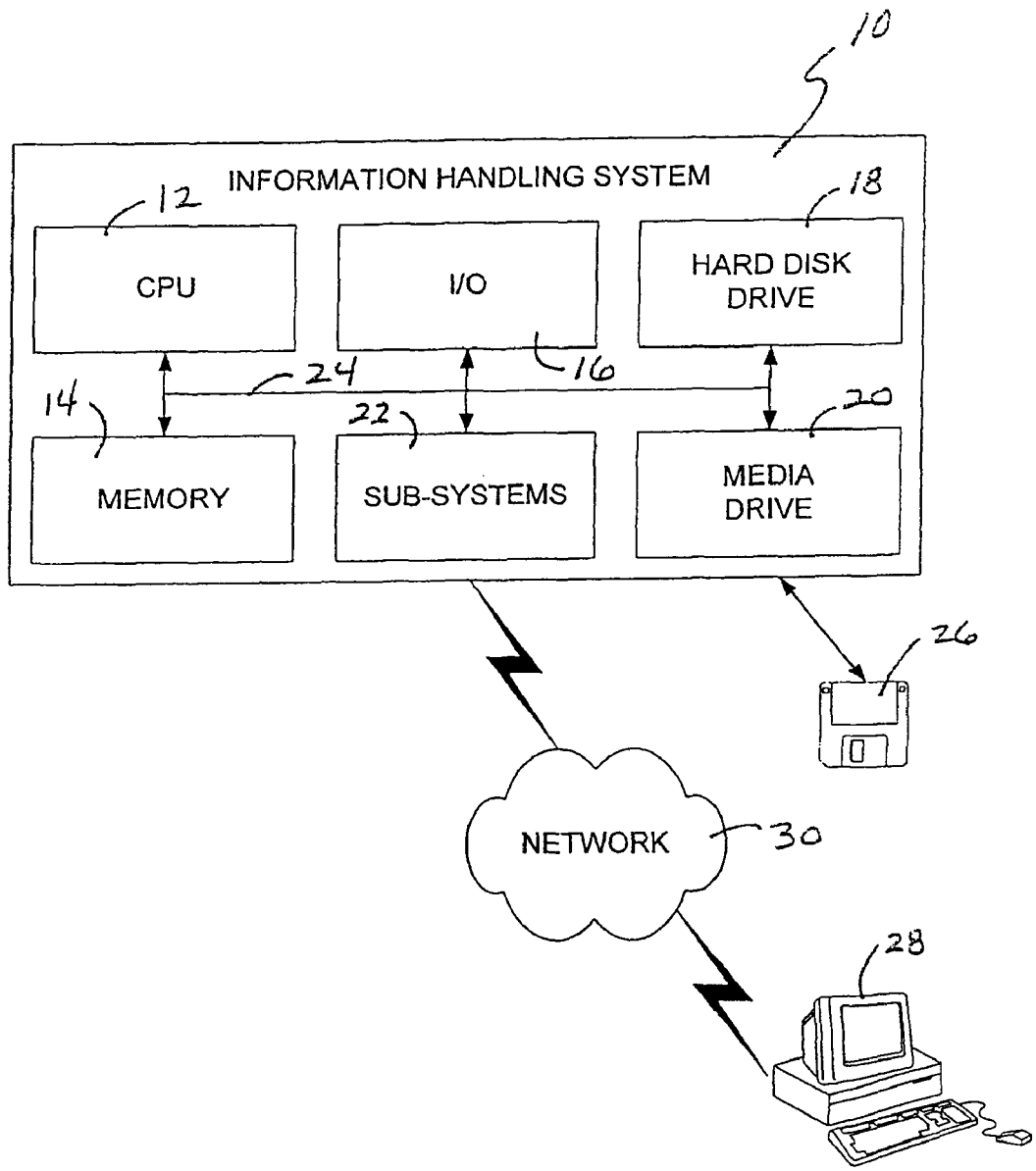
FIG. 1 is a system block diagram of an information handling system for detecting malicious code, according to one embodiment of the present disclosure.

FIG. 1 is a system block diagram of an information handling system 10 (or "computer" or "computer system" or "machine") for detecting malicious code, according to one embodiment of the present disclosure. Although the present disclosure describes some of the most common forms of malicious code, the present disclosure relates to all forms of malicious code.

Malicious code is computer software code that is executed by an information handling system and can be used for malicious purposes, such as damaging, altering or using the system without permission or knowledge of the system's owner or user, even if the code also has legitimate purposes. For example, a remote control program can be used by a system administrator to perform legitimate operations on another user's computer, but the remote control program may nevertheless be considered malicious code, because it can also be used for malicious purposes. Code is embodied in the form of one or more executable instructions and/or their associated operands for an information handling system ("programs" or "computer programs"), according to a variety of techniques, such as an independent program, a library, a thread, a routine or subroutine, or an operating system component, any of which can be written in any computer programming language (e.g., scripting languages, interpreted languages, compiled languages, assembly languages or machine code).

Malicious code is stored in any computer-readable medium, such as a hard disk drive, floppy diskette, CD-ROM, DVD or memory. During operation of an information handling system, malicious code has one or more states, such as active, inactive, executing (or "running"), not executing, hidden or visible. In the illustrative embodiments, the malicious code detection program is operable to detect malicious code, irrespective of the malicious code's states, and irrespective of the computer-readable media storing the malicious code.

Trojan horses ("trojans") are a particular type of malicious code. The trojan is executable code that exists in a variety of different forms. For example, some (but not all) forms of trojans are instantiated in executable code as one or more programs, threads inside other programs, plugins or shared modules loaded by other programs, or modules loaded into operating system kernel memory in the manner of a device driver or loadable kernel module. A trojan is a form of malicious code that enables a person to remotely control someone else's computer. The person who remotely controls the computer is known as the "Evil Hacker" (or "hacker") while the person whose computer is being remotely controlled is known as the "Innocent Victim" (or "victim"). BackOrifice2000, SubSeven, NetBus and OptixPro are all examples of trojans. Trojans are sometimes referred to as "back-doors" or "hacker back-doors."

Most trojans have two components, the client program (trojan client) that is executed by the evil hacker's computer and the server program (trojan server) that is executed by the innocent victim's computer. Some trojans have only a trojan server that can be remotely controlled through manually entered commands rather than through the programmatic interface of a trojan client.

There are many ways to infect a computer with a trojan including sending the innocent victim the trojan server disguised as a valid program, copying the trojan server onto the innocent victim's computer, or exploiting a vulnerability in the innocent victim's computer to place the trojan server on the computer.

Several techniques exist that are effective for detecting some forms of malicious code. For example, some types of malicious code can be detected by examining the binary code image of the program during its execution or the binary code image of the program when it is stored on a storage device. Many malicious code programs can be identified by a unique bit or byte pattern. The unique bit or byte pattern can include the entire image of the program while it is stored in memory or while it is stored on disk. The signature can also be a bit or byte pattern that is a portion of the program in memory or on disk. Once the unique sequence has been identified, a signature can be developed to identify the sequence. The signature is often the bit or byte pattern itself or it is in the form of a checksum. A detection program can then search for a malicious code program using the signature to identify the unique bit or byte sequence. Trojans, however, may be configurable to have no easily identifiable signature. Trojans may have configuration parameters that change the bit or byte sequences in the program and make it difficult or impossible to provide a unique signature. Various tools can be used to reconfigure a trojan, so that it will not have a known signature.

Another technique used to identify trojans examines the behavior of a trojan server while the trojan server is loaded and installed on a computer. With such a technique, a loaded and installed program is first placed into a sandbox, which includes a restricted area on the computer where the program (e.g., trojan server) can be examined safely. While such an approach may be effective for preventing some trojan infection, the approach does not however detect trojan servers once they are already installed on a computer. Such an approach does not detect many trojan servers because trojans do not exhibit their most characteristic behaviors while they are being loaded or installed, but rather they come alive and exhibit their malicious behavior after they have been loaded and installed.

Remote control software ("remote control"), such as pcAnywhere and VNC, is another type of malicious code, which has much of the same functionality as trojans. These programs allow for remote administration (via a "client" on a host personal computer ("PC")) of a target PC that is executing the "server" portion of the program. A goal of a trojan is to be stealth and transparent to the innocent victim, so as to remotely control the PC or other machine. By comparison, a goal of remote controls is to allow a trusted remote user to administer the machine for efficiency purposes. Nevertheless, remote controls can also be used by an evil hacker to remotely control a machine that is "infected" by the unauthorized remote control, in a stealthy and malicious manner. Moreover, even if a remote control is is operated by a trusted legitimate user, the remote control can also be used by malicious individuals if proper security precautions are not taken (e.g., password protection, authentication, encryption). Accordingly, remote controls can be used for malicious purposes, so the present disclosure relates to them as well.

Keystroke loggers ("keyloggers" or alternatively "keyboard loggers") are another type of malicious code. The keylogger is executable code that can exist in one of many forms. For example, some forms of keyloggers can be instantiated in executable code as one or more programs, computer files, threads inside other programs, plugins or shared modules loaded by other programs, or modules loaded into operating system kernel memory in the manner of a device driver or loadable kernel module. A keylogger is a form of malicious code that enables a person to obtain the actual "punched" keystrokes from an infected computer. A record of the keystrokes usually exists in the form of a file on the file system, which stores the "punch for punch" results of what was typed at the keyboard. Also, some keyloggers provide capability for e-mailing (to an e-mail address) a record of the captured keystrokes, in order to share access and remotely identify the typed characters. Alternate access mediums are sometimes used for obtaining a record of the keystrokes, such as physical access to the infected system, e-mailing a file to a configured e-mail account, or "backdoor" access to the machine via a trojan. Sinred, Fearless KeySpy, and TeeJayEm KeySpy are examples of keyloggers. Typically, a keylogger is a software application (e.g., which may be, but is not necessarily, a standalone application) that exists in a machine's operating system.

Monitoring software is another type of malicious code, which has many similarities to keyloggers. In many respects, monitoring software performs operations that are similar to a keylogger. Monitoring software is often used to monitor a wide range of the computer's activity. For example, monitoring software is useful for a person to obtain a recorded log of actions that children, a spouse, friends, co-workers and others perform on their computers. Unlike keyloggers, monitoring software is often, but not always, purchased from a software vendor and installed by the computer's owner to achieve a new layer of surveillance over the computer owner's machine.

Spyware is an Internet term for advertising supported software ("adware"). Spyware differs from other malicious code, because spyware has legitimate purposes, in addition to potentially malicious purposes. Spyware is installed in a computer, according to a variety of techniques. Spyware's primary purpose is the gathering of marketing and statistical information about a user's electronic behavior, together with the reporting of such information via the infected machine's Internet connection to one or more collection servers via the Internet. According to the privacy policies of many advertising companies that develop and distribute spyware, no sensitive information (or other information that identifies the individual user) is authorized to be collected from the user's computer. Such a policy is helpful to allay possible concerns regarding invasion of privacy or malicious purpose. Nevertheless, such policies are not always adopted or followed. Many spyware examples contain a "live" server program executed by the machine, which is capable of sending personal information and web-surfing habits to a remote location. Accordingly, spyware is also covered by the present disclosure, because spyware can be used for malicious purposes.

Spyware has resulted in congestion of Internet web pages, as an increasingly large number of vendors create and distribute spyware via Internet sites that attract visitors. Spyware has also become a popular technique for shareware authors to profit from a product, other than by selling it directly to users. For example, if a user prefers, it can freely install an application bundled with spyware, instead of purchasing a license to the application. Several large media companies offer to place banner advertisements in software products, in exchange for a portion of revenue from sales resulting from the software products' display of the banner. This technique has increased in popularity, because users can avoid paying for the software products, and the software product developers receive money from alternate sources. If the user is annoyed by the banners, the user is usually given an option to remove them by paying a regular licensing fee for the software products.

Spyware is not illegal, but it raises various privacy issues for certain users. Such privacy issues are raised when the spyware tracks and sends information and statistics via a private Internet connection that operates in the "background" of the user's PC, using a server program that is installed on the user's PC. In a written privacy statement, legitimate adware companies will disclose the nature of such information that is collected and transmitted, but the user is typically unable to actually control it.

Worms are another type of malicious code that exists in a variety of different forms. For example, some (but not all) forms of worms are instantiated in executable code as one or more programs, computer files, threads inside other programs, plugins or shared modules loaded by other programs, or modules loaded into operating system kernel memory in the manner of a device driver or loadable kernel module. Worms are distributed ("spread") via a computer network, such as the Internet. From the computer network, they penetrate a computer's memory, calculate network addresses of other computers, and send copies of themselves to such addresses for additional replication. Worms often exploit OS, application or service vulnerabilities to propagate themselves and penetrate remote machines. Worms have various purposes, designs, propagation media, and techniques for exploiting vulnerabilities. On the machine, worms may deposit a "payload," which performs some or no operation. Frequently, this payload includes a trojan or keylogger. Examples of worms are Code Red and Sircam. Worms are convenient vehicles for evil hackers to distribute other types of malicious code.

Viruses are another type of malicious code that can exist in a variety of different forms, such as macro viruses, boot sector viruses, and parasitic viruses. For example, some (but not all) forms of viruses are instantiated in executable code are as one or more programs, computer files, threads inside other programs, plugins or shared modules loaded by other programs, or modules loaded into operating system kernel memory in the manner of a device driver or loadable kernel module. Some viruses merely replicate by inserting (or attaching) themselves to a medium, in order to infect another program, boot sector, partition sector, or document that supports macros. But many viruses additionally inflict a large amount of damage on the machine. On the machine, viruses may deposit a payload, which performs some or no operation. Frequently, this payload includes a trojan or keylogger.

Malicious code, such as trojans, keyloggers, worms and viruses, can be used by evil hackers to disrupt the normal operation of the innocent victim's computer, to spy on the innocent victim, to steal money from the innocent victim, or to steal intellectual property from the innocent victim. The evil hacker often uses the innocent victim's computer to perform these malicious activities, in order to harm the innocent victim's associated organization (e.g., company or government). Accordingly, such malicious code can harm a computer system, irrespective of whether the computer system belongs to an individual or an organization.

Information handling system 10 includes one or more of: a central processing unit (CPU) 12, memory 14, input/output (I/O) devices, such as a display, a keyboard, a mouse, and associated controllers, collectively designated by a reference numeral 16, a hard disk drive 18, or other storage devices or media drives, such as a floppy disk drive, a CD-ROM drive, a DVD drive, and memory device, collectively designated by a reference numeral 20, and/or various other subsystems, such as a network interface card or wireless communication link (collectively designated by a reference numeral 22), all interconnected, for example, via one or more buses (shown collectively as a bus 24). Examples of information handling systems are a personal computer system, a personal digital assistant, a thin client device, a thick client device, or similar information handling device.

In one embodiment, the information handling system (IHS) 10 is configured with a suitable operating system for installing and executing instructions from one or more computer readable media 26, such as a hard disk drive, floppy diskette, CD-ROM, DVD, or memory. Information handling system 10 may further be configured for communicating with another information handling system 28 (e.g., through a network 30 via a suitable communication link or links). The operating system of IHS 10 may optionally include instructions for installing and executing programs, and for downloading information via network 30. The illustrative embodiments of the present disclosure may be practiced over an intranet, the Internet, virtual private network, or other suitable communication network.

According to one embodiment, the technique for malicious code detection is implemented in the form of computer software, the computer software including instructions executable by the CPU of a computer system, such as an innocent victim's computer system. The instructions include suitable program code processable by the computer system for performing the various functions as described herein. The various functions as discussed herein can be programmed using programming techniques well known in the art.

One technique for detecting malicious code includes a technique for detecting the portion of the malicious code that resides on a target computer system, such as an innocent victim computer system. For some forms of malicious code, such as keyloggers and Viruses, all of the malicious code resides on the innocent victim's computer system. For other forms of malicious code, such as trojans and remote controls, only the server portion of the malicious code resides on the innocent victim's computer system. The procedure can be embodied in a computer program, such as a malicious code detection program. The malicious code detection program detects the presence of (and identifies) the malicious code before, during and/or after the malicious code executes on the victim's computer system.

Figure 2:
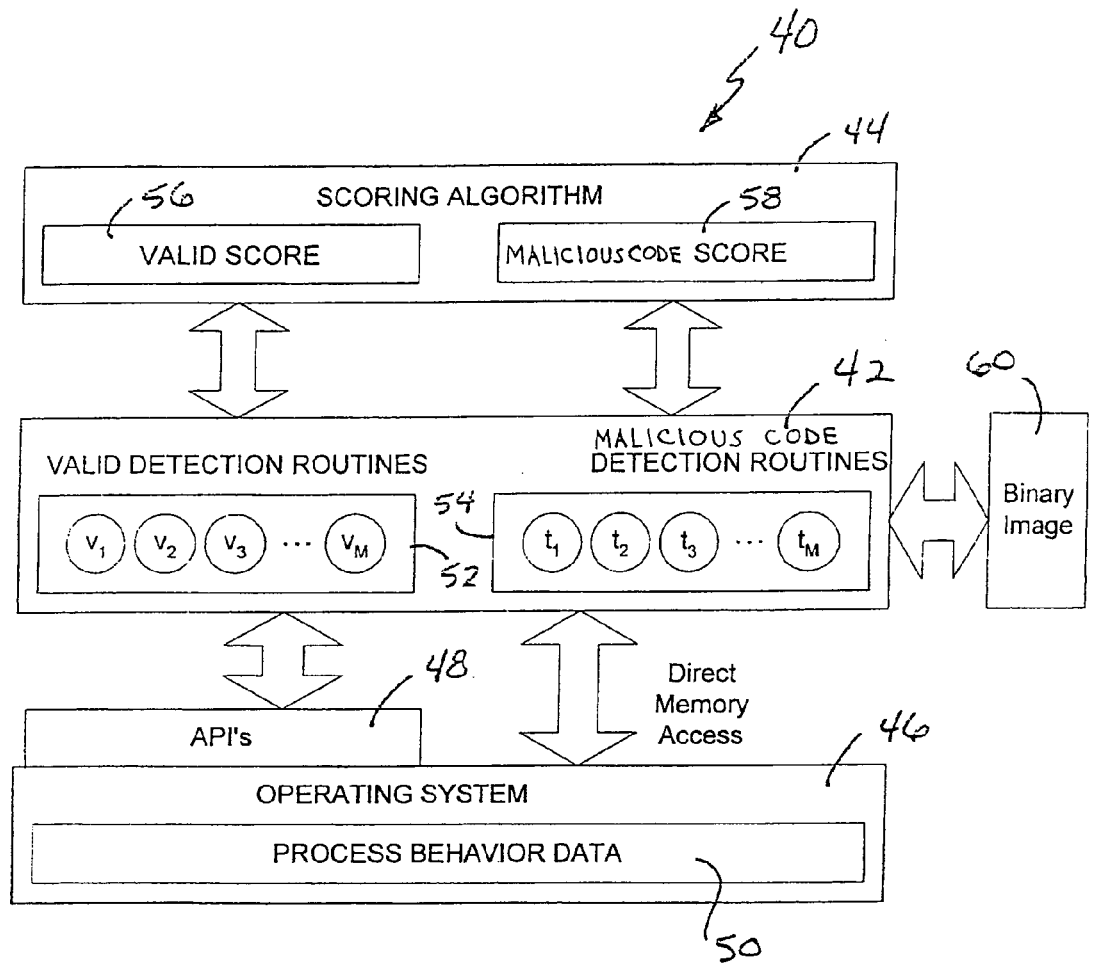
FIG. 2 is a process diagram of a detection architecture of a malicious code detection program, according to one embodiment of the present disclosure.

FIG. 2 illustrates an architecture of a malicious code detection program 40 that is executed by the information handling system 10 according to an embodiment of the present disclosure. The malicious code detection program 40 includes detection routines 42 and a scoring algorithm 44. The detection routines 42 operatively couple to the operating system 46 of the computer system under investigation via application programming interfaces (APIs) 48. The detection routines also access process behavior information (e.g., data) 50 and binary image information 60, according to the particular requirements of a corresponding detection routine, further as discussed below.

In one embodiment, the malicious code detection program operates as follows. The malicious code detection program executes at any time, on an as-needed basis, a periodic basis, a random basis, another scheduled basis, or on an event driven basis in response to a particular event according to the particular requirements of a given situation. In the illustrative embodiments, the malicious code detection program includes instructions for the information handling system to examine characteristics and behaviors of the information handling system's instructions and/or data.

The malicious code detection program includes instructions for the information handling system to evaluate the information handling system's instructions and/or data to determine whether such instructions and/or data are valid code (i.e., non-malicious) or malicious code or any one or more types. The malicious code detection program includes respective detection routines, sets of weights, and weighted scoring algorithms for detecting one or more types of valid code and/or one or more types of malicious code.

The malicious code detection program 40 contains detection routines 42, including valid program detection routines 52 and malicious code detection routines 54. The valid program detection routines 52 include one or more routines identified by $v_1, v_2, v_3, \ldots, v_M$ in FIG. 2. The valid program detection routines 52 are configured to determine whether the program under investigation has characteristics and behaviors usually associated with a valid program. The malicious code detection routines 54 include one or more routines identified by $t_1, t_2, t_3, \ldots, t_N$ in FIG. 2. The malicious code detection routines 54 are configured to determine whether the program under investigation has characteristics and behaviors usually associated with a malicious code program.

In one embodiment, the valid program detection routines 52 and the malicious code detection routines 54 are configured to gather a variety of characteristic and behavior information from the information handling system in a variety of ways, such as: (a) examining the program itself; (b) accessing information from the operating system 46 using application programming interfaces (APIs) 48 to the operating system (including documented APIs and/or undocumented API's); (c) kernel and/or device driver interfacing; and/or (d) direct access to resources of the information handling system such as memory, network connections, storage media, and/or other devices. For example, as shown in FIG. 2, the detection routines 42 gather such information by examining one or more of (a) a binary image 60 or (b) a library or other information (e.g., tables showing a program's network connection activity) that indicates the aforementioned characteristics and behaviors, such as process behavior information 50.

For example, a detection routine 42 can be configured to account for the following. Many trojans, keyloggers, remote controls and monitoring software programs log keystrokes on the innocent victim's computer and transmit the keystroke information from the innocent victim's computer to the evil hacker's computer. In one embodiment, a malicious code detection routine 54 determines whether the program being examined is logging keystrokes. Since there are many different ways for a program to log keystrokes, one or more of the malicious code detection routines 54 can be configured to examine the program under investigation to determine whether the program is using any of a number of different mechanisms for logging keystrokes. Detection routines may output many different types of results, such as numeric values, boolean values, counts or lists.

The malicious code detection program 40 further includes a scoring algorithm 44. In the illustrative embodiment, the scoring algorithm calculates two scores, namely a valid program score 56 and a malicious code score 58. In an alternative embodiment, the scoring algorithm calculates the valid program score 56, but not the malicious code score 58. In another alternative embodiment, the scoring algorithm calculates the malicious code score 58, but not the valid program score 56.

If the result of a valid program detection routine 52 indicates that the characteristic or behavior of the program being examined was that of a valid program, then a weight, $W_i$, is associated with the routine and that weight contributes positively to the valid program score 56. A weight, $W_i$, is assigned to each valid program detection routine, for i=1 to M, where M is the number of the valid program detection routine.

The weight indicates (a) the detection routine's importance, (b) the extent to which the particular behavioral trait being measured by the detection routine is present, and (c) the extent to which the behavioral trait contributes to the determination of whether the program is valid or malicious. To determine the value that results from combining the weight with the results of the detection routine, the information handling system performs any one or more of a variety of operations, such as performing an arithmetic or algebraic operation on the combination of the weight and the result of the detection routine or simply assigning the combination a numerical value.

If the result of a malicious code detection routine 54 indicates that the characteristic or behavior of the program being examined was that of a malicious code program, then a weight, $W_j$, is associated with the routine and that weight contributes positively to the malicious code score 58. A weight, $W_j$, is assigned each malicious code detection routine, for j=1 to N, where N is the number of the malicious code detection routine.

According to one embodiment, the scoring algorithm 44 includes an algorithm that has an algebraic formula for determining the two scores 56 and 58. The scoring algorithm is dependent on the valid program detection routines 52 and the weights, $W_i$, associated with each valid program detection routine, in addition to, the malicious code detection routines 54 and the weights $W_j$, associated with each malicious code detection routine. The algebraic formula or equation can also be made arbitrarily complex (e.g., associating additional weights to one or more to combinations of detection routines 42.

In one embodiment, the scoring algorithm 44 includes an algebraic equation defined as a sum of weighted values. For example, the algebraic equation for the valid program detection routines can include an equation as given by:

$$\text{VALID SCORE} = \sum_{i=1}^{M} W_i,$$

where $W_i$=weight of a valid detection routine $v_i$ for i=1 to M.

Similarly, the algebraic equation for the malicious code detection routines can include an equation as given by:

$$\text{MALICIOUS CODE SCORE} = \sum_{j=1}^{N} W_j,$$

where $W_j$=weight of a malicious code detection routine $t_j$ for j=1 to N.

In another embodiment, more complex forms of the scoring algorithm 44 can be implemented in the form of more sophisticated algebraic formulae.

If a program under investigation exceeds a valid program score threshold, $V_{thres}$, then it is determined that the program is a valid program. If that program exceeds a malicious code score threshold, $T_{thres}$, then it is determined that the program is a malicious code program. If a program is deemed to be valid using the valid algorithm, then it is sometimes eliminated from consideration as a malicious code program.

Executable code and/or programs under investigation may also have some of the characteristics and behaviors of valid programs and some of the characteristics and behaviors of malicious code. If a program does not exceed either threshold or if a program does not have a significant difference between the valid program score 56 and the malicious code score 58, then according to another embodiment of the present disclosure, the technique identifies the program in another category of suspicious programs or anomalous programs.

In one embodiment, the technique for detecting malicious code on a computer system includes executing a malicious code detection program on the computer system. The malicious code detection program includes detection routines. The malicious code detection program applies the detection routines to programs on the computer system. The detection routines are assigned weights that are factored by a scoring algorithm to determine a composite score based on the results of the detection routines and their associated weights. For example, a malicious code detection routine has a weight associated with it, such that if the malicious code detection routine determines that a given code under investigation is a malicious code program, then the weight is applied positively towards the malicious code score for the code under investigation. Also, the malicious code detection program determines whether one or more programs are valid or malicious as a function of the weights assigned to the detection routines.

In another embodiment, the technique is configured to detect malicious code on a computer having an operating system. The technique includes executing a malicious code detection program on the computer. Detection routines of the malicious code detection program are configured to gather information about programs on the computer system. The detection routines include at least one selected from the group consisting of (a) examining each executable code or program itself and (b)searching for information about each executable code or program in the operating system. For example, examining code or a program can include examining a binary image of the same, wherever the binary image may reside, within the IHS or in computer readable media accessible to the IHS. In addition, the detection routines further consist of valid program detection routines and malicious code detection routines.

The malicious code detection program applies the detection routines to the programs on the computer system. In response to a detection of a valid program or malicious code, the detection routines assigns weights to respective programs under test as a function of a respective detection routine. Also, the malicious code detection program determines whether a program is a valid program or malicious code as a function of the weights assigned by the detection routines. Determining whether the program is a valid program or malicious code involves the scoring of an execution of each detection routine as a function of a respective weight. A scoring algorithm is used to identify a program as malicious code in response to a valid score and a malicious code score, as discussed herein.

In yet another embodiment, the technique for detecting malicious code on a computer system includes executing detection routines, the detection routines having been configured to examine at least one selected from the group consisting of characteristics and behaviors of programs on the computer system. For example, the detection routines can be configured to access process behavior information of a program on the computer system. In addition, the characteristics and behaviors may include one or more of logging keystrokes, saving a display screen view, uploading files, downloading files, executing programs, and controlling a display screen of the computer system.

Subsequent to execution of one or more of the detection routine, weights are assigned as a function of the examined characteristics and behaviors, the assigned weights indicative of a valid program or malicious code as a function of respective detection routines. Also, the technique determines whether a program is malicious code as a function of the weights assigned by the detection routines.

In the embodiment of the previous paragraph, the detection routines include valid program detection routines and malicious code detection routines. The valid program detection routines are configured to determine whether the program exhibits at least one or more characteristics and behaviors associated with a valid program. The malicious code detection routines are configured to determine whether the program exhibits at least one or more characteristics and behaviors associated with malicious code.

In one embodiment, the technique for detecting malicious code is implemented in the form of a computer program. The computer program is executed on a desired computer system for detecting any potential malicious code on the computer system. Execution of the computer program continues until all active programs on the computer system have been tested and evaluated. Alternatively, other criteria may be established for a duration of testing with the malicious code detection program. For example, execution of the malicious code detection program can be configured to occur in response to one or more of a random initiation and a periodic initiation.

According to another embodiment, the malicious code detection program includes a small program configured for being delivered quickly, as well as, for being executed quickly. The malicious code detection program can be delivered to the innocent victim's computer over a network, such as a Local Area Network (LAN), Wide Area Network (WAN), Internet, intranet, or any other global computer network 30. The malicious code detection program may also be delivered via suitable computer readable media, such as, media 26 shown in FIG. 1.

While not stopping an infection of the computer system with malicious code programs, the technique of the present embodiments identifies a malicious code program when executing on a computer system. The technique for identifying a malicious code program is suitable for combination with other techniques, such as a technique for detecting infection, resulting in a more robust computer system malicious code protection implementation.

Where the foregoing disclosure mentions that code performs an operation, it is understood that the information handling system performs the operation in response to the information handling system's execution of the code.

Although illustrative embodiments have been shown and described, a wide range of modification, change and substitution is contemplated in the foregoing disclosure and, in some instances, some features of the embodiments may be employed without a corresponding use of other features. Accordingly, all such modifications are intended to be included within the scope of the embodiments. Accordingly, it is appropriate that the appended claims be construed broadly. In the claims, means-plus-function clauses are intended to cover the structures described herein as performing the recited function and not only structural equivalents, but also equivalent structures.

What is claimed is:

1. A computer-implemented method comprising:

selecting an active program on a computer system as code under investigation, wherein the program is running on an operating system of the computer system; and executing each of a first and a second plurality of detection routines on the operating system of the computer system, wherein the first plurality of detection routines are executable to determine whether the selected code under investigation has characteristics and behaviors usually associated with a valid program, wherein the second plurality of detection routines are executable to determine whether the selected code under investigation has characteristics and behaviors usually associated with a malicious program, and wherein said executing includes:

applying each of the first plurality of detection routines to the code under investigation to obtain a corresponding one of a first plurality of results; and weighting each of the first plurality of results to obtain a first score indicative of whether the code under investigation is valid code;

applying each of the second plurality of detection routines to the code under investigation to obtain a corresponding one of a second plurality of results;

weighting each of the second plurality of results to obtain a second score indicative of whether the code under investigation is malicious code; and upon completing the executing of the first and second plurality of detection routines, using at least one of the first and second scores to categorize the code under investigation with respect to the likelihood of the code under investigation compromising the security of the computer system.

2. The method of claim 1, wherein said method is performed repeatedly until a plurality of active programs on the computer system have been categorized with respect to their likelihood of compromising the security of the computer system.

3. The method of claim 1, wherein the second plurality of detection routines are configured to detect remote control software.

4. The method of claim 1, wherein the second plurality of detection routines are configured to detect a keystroke logger.

5. The method of claim 1, wherein the second plurality of detection routines are configured to detect spyware.

6. The method of claim 1, wherein the second plurality of detection routines are configured to detect a worm.

7. The method of claim 1, wherein the second plurality of detection routines are configured to detect a virus.

8. The method of claim 1, wherein the second plurality of detection routines are configured to detect monitoring software.

9. A computer-implemented method comprising:

selecting code currently running on a computer system as code under investigation, wherein said code is running on an operating system of said computer system; and executing each of a first and a second plurality of detection routines on the operating system of the computer system, wherein said executing includes:

applying each of the first plurality of detection routines to the code under investigation to obtain a corresponding one of a first plurality of results;

weighting each of the first plurality of results to obtain a first score indicative of whether the code under investigation is valid code;

applying each of the second plurality of detection routines to the code under investigation to obtain a corresponding one of a second plurality of results; and weighting each of the second plurality of results to obtain a second score indicative of whether the code under investigation is malicious code, wherein the second score is independent of the first score; and upon executing each of the first and second plurality of detection routines:

using at least one of the first and second scores to categorize the code under investigation into one of a plurality of categories, including first and second categories indicative of valid code and malicious code, respectively;

wherein the first and second pluralities of detection routines each include at least one routine executable to determine a characteristic of the code under investigation and at least one routine executable to determine a behavior of the code under investigation.

10. The method of claim 9, wherein at least some of the code associated with the selected active code is running in kernel mode.

11. The method of claim 9, further comprising:

selecting additional active code as code under investigation; and executing each of the first and second pluralities of detection routines with respect to said selected code under investigation.

12. A computer system comprising:

a processor; and a memory storing program instructions executable by the processor to:

select a program currently running on a computer system as code under investigation, wherein said program is running on an operating system of said computer system; and execute each of a first and a second plurality of detection routines on the operating system of the computer system, including:

applying each of the first plurality of detection routines to the code under investigation to obtain a corresponding one of a first plurality of results;

weighting each of the first plurality of results to obtain a first score indicative of whether the code under investigation is valid code;

applying each of the second plurality of detection routines to the code under investigation to obtain a corresponding one of a second plurality of results; and weighting each of the second plurality of results to obtain a second score indicative of whether the code under investigation is malicious code; and upon completing execution of the first and second plurality of detection routines, use at least one of the first and second scores to make a determination whether the code under investigation represents a security threat to the computer system;

wherein the first and second pluralities of detection routines each include at least one routine executable to determine a characteristic of the code under investigation and at least one routine executable to determine a behavior of the code under investigation.

13. A computer-readable storage medium having stored thereon program instructions that are executable by a computer system to:

select a program currently running on an operating system of the computer system as code under investigation; and execute each of a first and a second plurality of detection routines on the operating system of the computer system, including:

applying each of the first plurality of detection routines to the code under investigation to obtain a corresponding one of a first plurality of results, wherein the first plurality of detection routines includes at least one routine executable to test for a characteristic typically associated with valid code and at least one routine executable to test for a behavior typically associated with valid code;

weighting and combining each of the first plurality of results to obtain a first composite score;

applying each of the second plurality of detection routines to the code under investigation to obtain a corresponding one of a second plurality of results, wherein the second plurality of detection routines includes at least one routine executable to test for a characteristic typically associated with malicious code and at least one routine executable to test for a behavior typically associated with malicious code; and weighting and combining each of the second plurality of results to obtain a second composite score; and upon executing each of the first and second plurality of detection routines, use at least one of the first and second composite scores to make a determination whether the code under investigation is malicious code.

14. The method of claim 1, further comprising:
determining from the first and second scores that the code under investigation is malicious code.

15. The method of claim 14, wherein the malicious code does not have a known signature.

16. The method of claim 1, wherein the malicious code is a previously unknown type of malicious code.

17. The method of claim 14, wherein the determination that the code under investigation is malicious code is based on the first score not exceeding a valid code threshold value and the second score exceeding a malicious code threshold value.

18. The method of claim 1, wherein the determination is made from the first and second scores that the code under investigation is valid code.

19. The method of claim 1, wherein the determination is made that the code under investigation is valid code, wherein the determination is made based on the first score exceeding a valid code threshold value, regardless of the second score.

20. The method of claim 1, wherein the determination is made that the code under investigation is valid code, wherein the determination is made based on the first score exceeding a valid code threshold and the second score not exceeding a malicious code threshold.

21. The method of claim 1, further comprising:
determining from the first and second scores that the code under investigation is suspicious code, wherein suspicious code has not been determined to be either valid or malicious code.

22. The computer system of claim 12, wherein the program instructions are executable by the processor to:
determine from the first and second scores that the code under investigation is malicious code.

23. The computer system of claim 22, wherein the malicious code is a previously unknown type of malicious code.

24. The computer system of claim 22, wherein the determination that the code under investigation is malicious code is based on the first score not exceeding a valid code threshold value and the second score exceeding a malicious code threshold value.

25. The computer system of claim 12, wherein the program instructions are executable by the processor to:
determine from the first and second scores that the code under investigation is valid code.

26. The computer system of claim 25, wherein the determination that the code under investigation is valid code is based on the first score exceeding a valid code threshold value, regardless of the second score.

27. The computer system of claim 12, further comprising program instructions executable by the processor to:
determine from the first and second scores that the code under investigation is suspicious code.

28. The storage medium of claim 13, wherein the program instructions are executable by the computer system to:
determine from the first and second scores that the code under investigation is malicious code.

29. The storage medium of claim 28, wherein the malicious code is a previously unknown type of malicious code.

30. The storage medium of claim 13, wherein the program instructions are executable by the computer system to:
determine from the first and second scores that the code under investigation is valid code.

31. The storage medium of claim 30, wherein the determination that the code under investigation is valid code is based on the first score exceeding a valid code threshold value, regardless of the second score.

32. The storage medium of claim 28, further comprising program instructions executable to:
determine from the first and second scores that the code under investigation is suspicious code.

33. The storage medium of claim 28, wherein the determination that the code under investigation is malicious code is based on the first score not exceeding a valid code threshold value and the second score exceeding a malicious code threshold value.

34. The method of claim 1, wherein at least some of the code associated with the selected active program is running in kernel mode.

35. One or more computer-readable storage media having stored thereon program instructions executable on a computer system to:
while a first program is running on an operating system of the computer system:
execute each of a first and second plurality of detection routines on the operating system of the computer system to gather information about the first program, wherein the first plurality of detection routines are executable to detect information about the first program that is indicative of valid code, and wherein the second plurality of detection routines are executable to detect information about the first program that is indicative of malicious code;
weight results of the first and second pluralities of detection routines;
use the weighted results of the first plurality of detection routines to determine a first value indicative of the likelihood that the first program is valid code;
use the weighted results of the second plurality of detection routines to determine a second value indicative of the likelihood that the first program is malicious code; and
use at least one of the first and second values to determine whether the first program is a security threat to the computer system; and
for each of a plurality of additional programs running on the operating system of the computer system:
execute each of the first and second pluralities of detection routines on the operating system of the computer system relative to that additional program; and
use weighted results of the execution of the first and second pluralities of detection routines to determine whether that additional program is a security threat to the computer system.

36. The computer-readable storage media of claim 35, wherein the program instructions are executable to determine whether the first program is a security threat to the computer system based on a first comparison between the first value and a valid code threshold value and also based on a second comparison between the second value and a malicious code threshold value.

37. The computer-readable storage media of claim 35, wherein the program instructions are executable to determine that the first program is a security threat to the computer system based on the first value not exceeding a valid code threshold value and on the second value exceeding a malicious code threshold value.

38. The computer-readable storage media of claim 35, wherein the program instructions are executable to determine that the first program is not a security threat to the computer system based on the first value exceeding a valid code threshold value, regardless of the second value.

39. The computer-readable storage media of claim 35, wherein the program instructions are executable to determine that the first program is not a security threat to the computer system based on the first value exceeding a valid code threshold value and on the second value not exceeding a malicious code threshold value.

40. A method, comprising:
while a first program is running on an operating system of a computer system, executing each of a first and second plurality of detection routines on the operating system of the computer system, wherein the first plurality of detection routines includes routines that are executable to detect information about the first program that is indicative of valid code, and wherein the second plurality of detection routines includes routines that are executable to detect information about the first program that is indicative of malicious code;
weighting results of the first and second pluralities of detection routines;
using weighted results of the first plurality of detection routines to compute a first value indicative of the likelihood that the first program is valid code;
using weighted results of the second plurality of detection routines to compute a second value indicative of the likelihood that the first program is malicious code; and
using at least one of the computed first and second values to categorize the first program as to the likelihood of the first program compromising the security of the computer system;
for each of a plurality of additional programs running on an operating system of the computer system:
executing each of the first and second pluralities of detection routines on the operating system of the computer system relative to that additional program;
using weighted results of the execution of the first and second pluralities of detection routines to categorize that additional program as to the likelihood of that additional program compromising the security of the computer system.

41. The method of claim 40, wherein said using at least one of the computed first and second values includes performing comparisons involving the first and second values.

42. The method of claim 41, wherein said first program is categorized based on a comparison between the first value and a valid code threshold.

43. The method of claim 42, wherein the first program is categorized as not being a security threat based on the first value exceeding the valid code threshold, regardless of the second score.

44. The method of claim 41, wherein said first program is categorized based on a comparison between the first value and a valid code threshold and also on a comparison between the second value and a malicious code threshold.

45. The method of claim 44, wherein the first program is categorized as not being a security threat based on the first value exceeding the valid code threshold and the second value not exceeding the malicious code threshold.

46. The method of claim 1, wherein each of the detection routines within the first and second plurality of detection routines gathers a different type of information about the code under investigation, and wherein the first and second pluralities of detection routines are not themselves running on the operating system of the computer system in a manner that prevents the code under investigation from infecting the computer system.

47. The method of claim 1, wherein there is at least one detection routine within the collective first and second pluralities of detection routines that, when executed, obtains information about the code under investigation by accessing the operating system of the computer system via an API of the operating system.

48. The method of claim 9, wherein each of the detection routines within the first and second plurality of detection routines gathers a different type of information about the code under investigation, and wherein the first and second pluralities of detection routines are not themselves running on the operating system of the computer system in a manner that prevents the code under investigation from infecting the computer system.

49. The method of claim 9, wherein there is at least one detection routine within the collective first and second pluralities of detection routines that, when executed, obtains information about the code under investigation by accessing the operating system of the computer system via an API of the operating system.

50. The computer system of claim 12, wherein each of the detection routines within the first and second plurality of detection routines is executable to gather a different type of information about the code under investigation, and wherein the first and second pluralities of detection routines do not execute on the operating system of the computer system in a manner that prevents the code under investigation from infecting the computer system.

51. The computer system of claim 12, wherein there is at least one detection routine within the collective first and second pluralities of detection routines that is executable to obtain information about the code under investigation by accessing the operating system of the computer system via an API of the operating system.

52. The computer-readable storage medium of claim 13, wherein each of the detection routines within the first and second plurality of detection routines is executable to gather a different type of information about the code under investigation, and wherein the first and second pluralities of detection routines do not execute on the operating system of the computer system in a manner that prevents the code under investigation from infecting the computer system.

53. The computer-readable storage medium of claim 13, wherein there is at least one detection routine within the collective first and second pluralities of detection routines that is executable to obtain information about the code under investigation by accessing the operating system of the computer system via an API of the operating system.

54. The computer-readable storage media of claim 35, wherein each of the detection routines within the first and second plurality of detection routines is executable to gather a different type of information about the first program, and wherein the first and second pluralities of detection routines do not execute on the operating system of the computer system in a manner that prevents the first program from infecting the computer system.

55. The computer-readable storage media of claim 35, wherein there is at least one detection routine within the collective first and second pluralities of detection routines that is executable to obtain information about the code under investigation by accessing the operating system of the computer system via an API of the operating system.

56. The method of claim 40, wherein each of the detection routines within the first and second plurality of detection routines gathers a different type of information about the first program, and wherein the first and second pluralities of detection routines are not themselves running on the operating system of the computer system in a manner that prevents the first program from infecting the computer system.

57. The method of claim 40, wherein there is at least one detection routine within the collective first and second pluralities of detection routines that, when executed, obtains information about the code under investigation by accessing the operating system of the computer system via an API of the operating system.

58. The method of claim 1, wherein the second plurality of detection routines includes a first detection routine and a second detection routine, wherein the first detection routine is executable to determine a characteristic of a binary image of the active program, and wherein the second detection routine is executable to determine a behavior of the active program by accessing a location within the computer system other than the binary image of the active program.

59. The method of claim 58, wherein the first detection routine is executable to determine whether the binary image of the active program has a signature associated with a malicious program, and wherein the second detection routine is executable to determine whether the active program is logging keystrokes.

60. The method of claim 9, wherein the second plurality of detection routines includes a first detection routine and a second detection routine, wherein the first detection routine is executable to determine a characteristic of a binary image of the code under investigation, and wherein the second detection routine is executable to determine a behavior of the active program by accessing a location within the computer system other than the binary image of the code under investigation.

61. The method of claim 60, wherein the first detection routine is executable to determine whether the binary image of the code under investigation has a signature associated with a malicious program, and wherein the second detection routine is executable to determine whether the active program is logging keystrokes.

62. The computer system of claim 12, wherein the second plurality of detection routines includes a first detection routine and a second detection routine, wherein the first detection routine is executable to determine a characteristic of a binary image of the code under investigation, and wherein the second detection routine is executable to determine a behavior of the active program by accessing a location within the computer system other than the binary image of the code under investigation.

63. The computer system of claim 62, wherein the first detection routine is executable to determine whether the binary image of the code under investigation has a signature associated with a malicious program, and wherein the second detection routine is executable to determine whether the active program is logging keystrokes.

64. The storage medium of claim 13, wherein the second plurality of detection routines includes a first detection routine and a second detection routine, wherein the first detection routine is executable to determine a characteristic of a binary image of the code under investigation, and wherein the second detection routine is executable to determine a behavior of the active program by accessing a location within the computer system other than the binary image of the code under investigation.

65. The storage medium of claim 64, wherein the first detection routine is executable to determine whether the binary image of the code under investigation has a signature associated with a malicious program, and wherein the second detection routine is executable to determine whether the active program is logging keystroke.

* * * * *